(12) United States Patent
Montenegro

(10) Patent No.: US 11,004,045 B1
(45) Date of Patent: May 11, 2021

(54) DRIVE-UP BANKING WITH WINDOWS UP

(71) Applicant: Wells Fargo Bank, N.A., San Francisco, CA (US)

(72) Inventor: Dennis E. Montenegro, Concord, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 87 days.

(21) Appl. No.: 16/251,655

(22) Filed: Jan. 18, 2019

(51) Int. Cl.
*G06Q 20/10* (2012.01)
*G07F 19/00* (2006.01)
*H04W 4/80* (2018.01)

(52) U.S. Cl.
CPC ....... *G06Q 20/1085* (2013.01); *G07F 19/205* (2013.01); *G07F 19/201* (2013.01); *H04W 4/80* (2018.02)

(58) Field of Classification Search
USPC .......................................................... 705/43
See application file for complete search history.

(56) References Cited

U.S. PATENT DOCUMENTS

| | | |
|---|---|---|
| 4,392,119 A | 7/1983 | Price et al. |
| 4,735,289 A | 4/1988 | Kenyon |
| 5,217,088 A | 6/1993 | Dallman |
| 6,574,603 B1 | 6/2003 | Dickson et al. |
| 6,832,719 B2 | 12/2004 | Devries, Jr. et al. |
| 6,996,460 B1* | 2/2006 | Krahnstoever ......... G06F 3/011 701/1 |
| 7,848,830 B1* | 12/2010 | Gromley ............... G07F 19/205 700/43 |
| 9,004,353 B1 | 4/2015 | Block et al. |
| 9,639,907 B2* | 5/2017 | Theobald ............. G06Q 20/308 |
| 10,025,321 B2* | 7/2018 | Inderrieden ........... G07F 19/205 |
| 2002/0156682 A1 | 10/2002 | Dipietro |

(Continued)

OTHER PUBLICATIONS

How Technology Is Changing Banking Gart, Alan.Journal of Retail Banking; Arlington vol. 14, Iss. 1, (Spring 1992): 35.https://search.proquest.com/docview/214533736/62B6B048ACC64A2APQ/5?accountid=14753 (Year: 1992).*

(Continued)

*Primary Examiner* — Hani M Kazimi
*Assistant Examiner* — Hatem M Ali
(74) *Attorney, Agent, or Firm* — Foley & Lardner LLP

(57) ABSTRACT

Examples described herein relate to apparatuses and methods for reducing an amount of time that a user of a drive-up banking system is exposed to outdoor environmental conditions. A method includes detecting, by a drive-up banking system, a presence of a vehicle proximate the drive-up banking system; projecting, by the drive-up banking system, a user interface onto a vehicle window such that the user interface is visible to the occupant of the vehicle; receiving, by the drive-up banking system, information indicative of an identity of the occupant of the vehicle; determining, by the drive-up banking system, an account corresponding to the occupant of the vehicle; requesting, by the user interface, transaction information; receiving, by the user interface, information indicative of the transaction information; and conducting, by the drive-up banking system, a transaction based on the transaction information.

19 Claims, 7 Drawing Sheets

(56) References Cited

U.S. PATENT DOCUMENTS

| | | | |
|---|---|---|---|
| 2002/0180696 A1* | 12/2002 | Maritzen | H04L 29/06 |
| | | | 345/156 |
| 2014/0156328 A1* | 6/2014 | Grigg | G06F 16/9562 |
| | | | 705/7.15 |
| 2014/0279491 A1 | 9/2014 | Martin et al. | |
| 2016/0012411 A1* | 1/2016 | Kursun | G06Q 40/02 |
| | | | 705/42 |

OTHER PUBLICATIONS

Information technology and the management difference: A fusion map Keen, Peter G W.IBM Systems Journal; Armonk vol. 32, Iss. 1, (1993): .https://search.proquest.com/docview/222412648/62B6B048ACC64A2APQ/9?accountid=14753 (Year: 1993).*

High-tech has big impact on claim handling Mutch, John.National Underwriter, Property & casualty/risk & benefits management ed.; Erlanger vol. 103, Iss. 20, (May 17, 1999): 20-21+.https://search.proquest.com/docview/228600808/62B6B048ACC64A2APQ/43?accountid=14753 (Year: 1999).*

* cited by examiner

DRIVE-UP BANKING WITH WINDOWS UP

TECHNICAL FIELD

Embodiments of the present disclosure relate generally to the field of drive-up banking services.

BACKGROUND

Drive-up banking systems, such as automated-teller machines (ATM)s or other payment terminal devices are often in outdoor locations. Customers can access drive-up banking systems as drivers or occupants of vehicles. Conventional drive-up banking systems require customers to lower a vehicle window to interact with a user interface of the drive-up banking system to enter account information, transaction instructions, deposit physical media such as checks or physical currency, and/or retrieve withdrawn physical currency. While the vehicle window is open, occupant(s) of the vehicle can be exposed to uncomfortable outdoor conditions, such as cold temperatures, hot temperatures wind, rain, and/or snow.

SUMMARY

A first example embodiment relates to a method. The method includes detecting, by a drive-up banking system, a presence of a vehicle proximate the drive-up banking system; projecting, by the drive-up banking system, a user interface onto a vehicle window such that the user interface is visible to an occupant of the vehicle; receiving, by the drive-up banking system, information indicative of an identity of the occupant of the vehicle; determining, by the drive-up banking system, an account corresponding to the occupant of the vehicle; requesting, by the user interface of the drive-up banking system, transaction information; receiving, by the user interface of the drive-up banking system, information indicative of the transaction information; and conducting, by the drive-up banking system, a transaction based on the transaction information.

Another example embodiment relates to a drive-up banking system. The drive-up banking system includes a vehicle detection device, a projection device configured to project a user interface onto a vehicle window, a user input device, and a processing circuit. The processing circuit includes one or more processors coupled to non-transitory memory. The processing circuit is configured to detect a presence of the vehicle proximate the vehicle detection device, command the projection device to project the user interface onto the vehicle window, receive information indicative of an identity of an occupant of the vehicle, determine an account corresponding to the occupant of the vehicle, display a request for transaction information via the user interface, receive information indicative of the transaction information via the user input device, and conduct a transaction based on the transaction information.

Another example embodiment relates to a drive-up banking system. The drive-up banking system includes a vehicle detection device, a screen configured to be positioned proximate a vehicle window, a projection device configured to project a user interface onto the screen, a heat sensor configured to sense gestures at or proximate the vehicle window, and a processing circuit. The processing circuit includes one or more processors coupled to non-transitory memory. The processing circuit is configured to detect a presence of a vehicle including the vehicle window proximate the vehicle detection device, positon the screen proximate the vehicle window, command the projection device to project the user interface onto the screen, receive information indicative of an identity of an occupant of the vehicle, determine an account corresponding to the occupant of the vehicle, display a request for transaction information via the user interface, determine transaction information based on the gestures sensed by the heat sensor, and conduct a transaction based on the transaction information.

Another example embodiment relates to a drive-up banking system including a vehicle detection device, a user input/output device, a scanning device configured to scan objects at or proximate an interior surface of a vehicle window, and a processing circuit. The processing circuit includes one or more processors coupled to non-transitory memory. The processing circuit is configured to detect a presence of a vehicle including the vehicle window proximate the vehicle detection device, receive information indicative of an identity of an occupant of the vehicle, determine an account corresponding to the occupant of the vehicle, and display a request for transaction information via the user input/output device. The request for transaction information includes instructions to display an object proximate the vehicle window. The processing circuit is further configured to determine transaction information based on information received from the scanning device based on a scan of the object and conduct a transaction based on the transaction information.

These and other features, together with the organization and manner of operation thereof, will become apparent from the following detailed description when taken in conjunction with the accompanying drawings.

DETAILED DESCRIPTION

Figure 1:
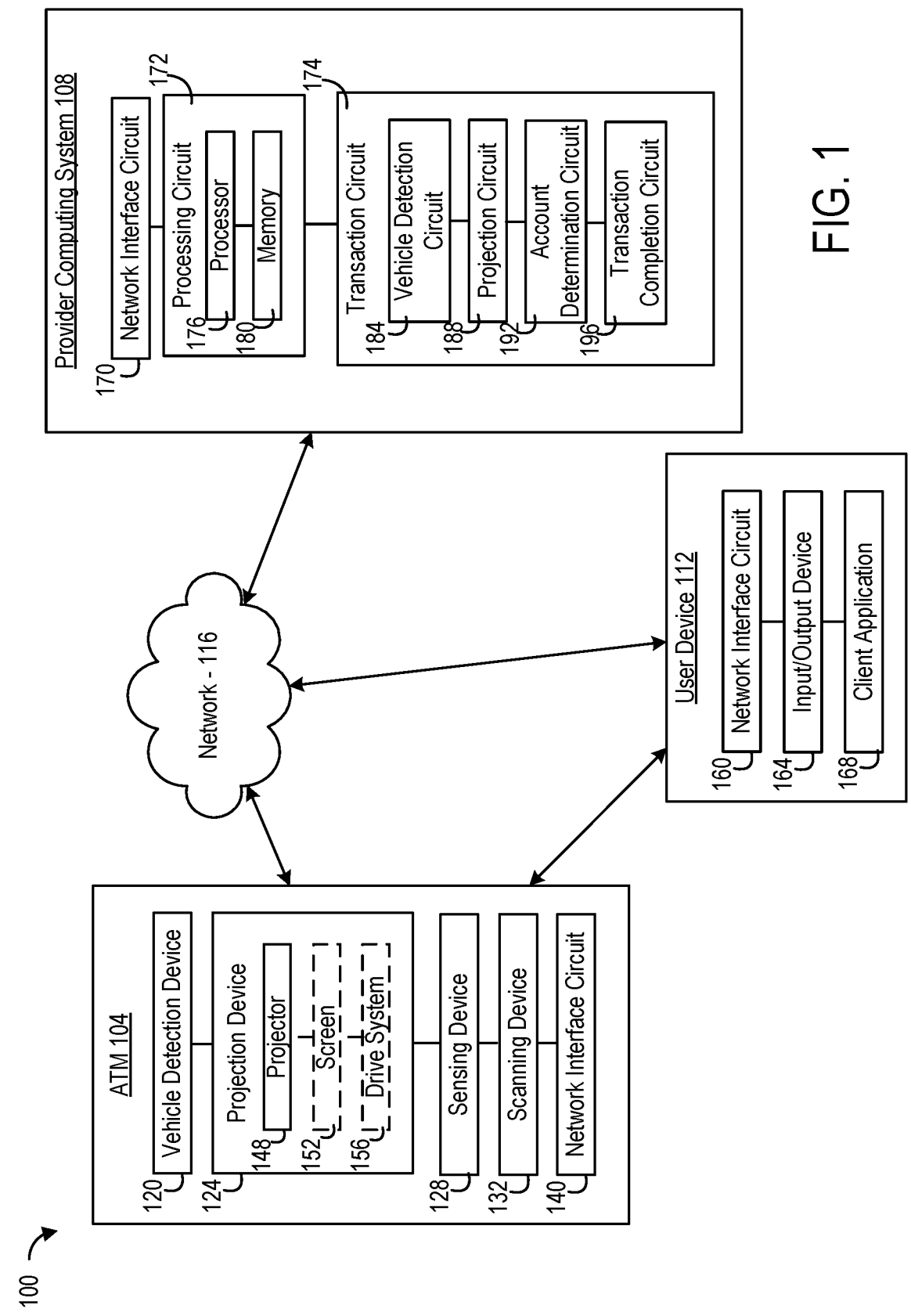
FIG. 1 is a block diagram depicting an example environment of a drive-up banking system including an ATM, according to an example embodiment.

Referring to the figures generally, systems and methods of providing drive-up banking services while reducing an amount of time that a vehicle occupant must have the vehicle window open while completing one or more transaction(s) at the drive-up banking system are disclosed. The drive-up banking system detects a presence of a vehicle at or proximate a drive-up banking system or an ATM of the drive-up banking system. The drive-up banking system displays a user interface to an occupant of the vehicle such that the occupant of the vehicle can interact with the user interface without opening the vehicle window. For example, in some embodiments, the drive-up banking system projects a user interface onto an interior surface of a vehicle window such that the user interface is visible to an occupant of the vehicle (e.g., the user). In other embodiments, the drive-up banking system deploys a screen proximate a vehicle window. In this case, the drive-up banking system projects a user interface onto a surface of the screen proximate the vehicle such that the user interface is visible to the user. The window can be the driver's window or the rear passenger window behind the driver's seat. The user interacts with the user interface in the same way that the user would interact with a touchscreen interface. For example, the user makes selections by tapping icons, scrolling through screens, etc. displayed on the window.

The drive-up banking system receives information indicative of an identity of a user. The drive-up banking system determines an account corresponding to the information indicative of the identity of the user. The drive-up banking system commands the projected user interface to request transaction information from the user. For example, the user interface presents instructions or a prompt to the user. The user interface prompts the user to enter transaction instructions and projects selections, buttons, or a keypad for the user to enter the transaction instructions. The user then uses the projected selections, buttons, or keypad to enter the transaction information. The drive-up banking system can sense the movements and/or gestures that the user makes against or proximate the window as the user interacts with the user interface. The drive-up banking system can prompt the user to present physical media for the drive-up banking system to scan. For example, the user interface can prompt the user to present transaction user identification information to the drive-up banking system so that a scanning device of the drive-up banking system can scan the user identification information. The drive-up banking system then authenticates the user's identity based on the scanned user identification information. In another example, the user interface can prompt the user to present transaction information such as checks or physical currency to be deposited for scanning. The drive-up banking system can then conduct a transaction based on the transaction information. For example, the drive-up banking system dispenses physical media such as physical currency or stamps. In another example, the drive-up banking system prompts the user to deposit physical media such as checks or physical currency. At this point, the user lowers the vehicle window to deposit and/or retrieve the physical media.

The embodiments described herein solve the technical problem of prolonged user exposure to uncomfortable environmental conditions while using a drive-up banking system. By leveraging a projected user interface, a sensor operable to sense gestures of a user interacting with the projected user interface, a processor operable to determine transaction information based on the sensed gestures, and a scanning device operable to scan physical media presented at or proximate the vehicle window, the drive-up banking system allows the user to input all or substantially all of the transaction instructions necessary to complete a desired transaction without lowering the vehicle window. Accordingly, the systems and methods for using the drive-up banking system of the present disclosure greatly reduce the amount of time that a vehicle window must be open by receiving transaction information, such as user identification information and transaction information, through the user interface projected on the closed vehicle window.

Referring to FIG. 1, a drive-up banking system 100 is shown, according to an example embodiment. The drive-up banking system 100 includes, among other things, an ATM 104, a provider computing system 108, and in some cases, a client computing system or user device 112. The ATM 104, the provider computing system 108, and the user device 112 may communicate directly or through a network 116, which may include one or more of the Internet, cellular network, Wi-Fi, Wi-Max, a proprietary banking network, or any other type of wired or wireless network.

The ATM 104 is a computing system configured to provide an interface between a user and the provider computing system 108, allowing the user to access information at and perform transactions with the corresponding provider. For example, in various arrangements, the ATM 104 is configured to allow a customer to view account balances, deposit checks, transfer funds, or withdraw funds from a given account in the form of physical currency. As referred to herein, the term "currency" includes fiat currencies, non-fiat currencies (e.g., precious metals), and math-based currencies (often referred to as cryptocurrencies). Examples of math-based currencies include Bitcoin, Litecoin, Dogecoin, and the like. In some embodiments, the ATM 104 is disposed at a drive-up banking facility associated with the provider. The ATM 104 includes hardware and associated logics enabling contactless data transfers, for example, using radio frequency identification ("RFID") and/or NFC.

Still referring to FIG. 1, according to an embodiment of the disclosure, the ATM 104 is owned and operated by the provider associated with the provider computing system 108. The ATM 104 performs various functions in response to an interaction with a user (e.g., via the projected user interface). In some embodiments, the ATM 104 is capable of both receiving deposits and dispensing funds. For example, the ATM 104 may include a currency dispenser that is used to dispense currency when the user wishes to perform a physical currency withdrawal. The ATM 104 may also include a deposit slot that is configured to receive paper currency and checks when the user wishes to make a deposit. The ATM 104 may also be configured to perform other operations, such as allowing the user to check account balances, purchase stamps, and so on.

The ATM 104 includes a network interface 140. The network interface 140 enables the ATM 104 to exchange information over the network 116. The ATM 104 can include a vehicle detection device 120, a projection device 124, a sensing device 128, a scanning device 132, the network interface 140, and an optional camera. The sensing device 128 and the scanning device 132 comprise user input devices. The ATM 104 is configured to activate in response to sensing a vehicle approaching the ATM 104 with the vehicle detection device 120.

The vehicle detection device 120 is configured to sense information indicative of a presence of a vehicle at or proximate the drive-up banking system 100 and/or at or proximate the ATM 104. The vehicle detection device 120 is configured to sense information indicative of a relative position between the vehicle and the projection device 124 to facilitate positioning the vehicle for interaction with the ATM 104. The vehicle detection device 120 is configured to sense information indicative of a location of a vehicle window. In some embodiments, the vehicle detection device 120 can include one or more sensors, such as a weight sensor, a heat sensor, a visual sensor, a proximity sensor, etc. In some embodiments, the vehicle detection device 120 can detect a wireless signal from the vehicle and/or the user device 112 positioned within the vehicle. For example, the vehicle detection device 120 can use geofencing to detect the user device 112 within a predefined region proximate the ATM 104.

The projection device 124 is configured to project a user interface onto a vehicle window such that the user interface is visible to a user sitting inside the vehicle. The window can be a driver's window or a passenger window behind the driver's window or opening the vehicle door. The user can interact with the user interface without lowering the vehicle window. The user interface may include a projected keypad, or similar user input device, containing a number of selections or buttons (e.g., alphanumeric, etc.) configured to receive input (e.g., a PIN, transaction instructions) from a user. The projection device 124 includes a projector 148 configured to project a user interface of the ATM 104 at or proximate a vehicle window. In some embodiments, the projection device 124 projects the user interface directly onto the vehicle window such that the user interface is displayed on an interior surface of the vehicle window so that a user can see and interact with the user interface at or proximate the vehicle window without lowering the window. In some embodiments, a film is attached to the interior surface of the vehicle window and the user interface is displayed on the film so that a user can see and interact with the user interface at the vehicle window without opening the vehicle window.

In some embodiments, the projection device 124 further includes a projection screen 152 and a projection screen drive system 156. In some embodiments, the projection screen 152 is a rear projection screen such that a user interface projected from a projector 148 behind the projection screen 152 is displayed to a user of the vehicle. In embodiments that include the projection screen 152 and the projection screen drive system 156, the projection screen drive system 156 is configured to lower the projection screen 152 such that the projection screen 152 is proximate the vehicle window so that a user can see and interact with the user interface at or proximate the vehicle window without lowering the vehicle window. In some embodiments, the projection screen 152 is positioned such that physical media positioned at or proximate the vehicle window can be scanned by the scanning device 132.

The sensing device 128 is configured to sense gestures made by a user at or proximate the vehicle window as the user interacts with the user interface. The gestures can include hand gestures, facial gestures, and/or a combination thereof. The hand gestures can include tapping, tapping and holding, pinching the screen (e.g., to shrink at least a portion the user interface), spreading apart pinched fingers (e.g., to expand at least a portion of the user interface), scrolling, sliding, holding up fingers to indicate a selection (e.g., holding up one finger to select a first option, holding up two fingers to select a second option, etc.), making the "o.k. sign", holding a thumb up, holding a thumb down, fingerspelling, sign language, etc. The facial gestures can include facial expressions (e.g., frown into indicate "no" or "help", smile to indicate "yes", etc.), nodding, shaking the head, etc. The sensing device 128 can sense the user's gestures through the glass of the vehicle window, such that the gestures can be sensed without requiring the user to open the vehicle window. In some embodiments, the sensing device 128 can include a motion sensor, a heat sensor, or a visual sensor (e.g., a camera). In embodiments that include the projection screen 152, the sensing device 128 is a heat sensor.

The scanning device 132 is configured to scan objects including physical media and/or portions of the body presented at or proximate the vehicle window. The scanning device 132 can scan the physical media and/or portions of the body through the window glass without requiring the user to open the vehicle window. The physical media can include physical identification documents (e.g., a drivers' license, a passport, a bank account passbook, an ATM card, a debit card, etc.), checks, or physical currency. The portions of the body are portions of the body that are common sources of biometric data, such as faces, eyes, fingerprints, and palms. In some embodiments, the biometric data can include scans of the portions of the body that are common sources of biometric data and/or behavioral biometric data. Behavorial biometric data can include gestures (e.g., a user writing or signing their name in the air, a specific hand gesture or facial expression that can be used as a PIN, etc.).

In some embodiments, the ATM 104 is operated by the provider computing system 108. In other embodiments the ATM 104 is operated by a separate computing system from the provider computing system 108 and is in communication with the provider computing system 108 over the network 116.

The user device 112 is a computing device associated with a user. In some arrangements, the user is an account holder of at least one account (e.g., checking account, a savings account, a credit account, an investment account, a retirement account, a brokerage account, a mortgage account, a rewards account, etc.) managed by the provider (associated with provider computing system 108). In some arrangements, the user is an account holder of a different entity.

The user device 112 includes any type of computing device that may be used to conduct transactions and/or communicate with the provider computing system 108 and/or the ATM 104. In some arrangements, the user uses the user device 112 to both communicate information to the ATM 104 over the network 116 as well as communicate information with the provider computing system 108. For example, in some embodiments, the ATM 104 can call the user device 112. The ATM 104 can provide verbal instructions to the user via the user device 112. The user can communicate transaction instructions to the ATM 104 using voice commands. The user device 112 may include any type of mobile device including, but not limited to, a phone (e.g., smart phone, etc.), tablet, personal digital assistant, braille tablet, and/or personal computing devices (e.g., desktop computer, laptop computer, personal digital assistant, etc.).

Still referring to FIG. 1, the user device 112 includes a network interface 160 enabling the user device 112 to exchange information over the network 116, an input/output device 164, and a client application 168. The input/output device 164 is configured to exchange information with the user. An input device or component of the input/output device 164 allows the user to provide information to the user device 112, and may include, for example, a mechanical keyboard, a touchscreen, a microphone, a camera, a fingerprint scanner, any user input device engageable with the user device 112 via a USB, serial cable, Ethernet cable, and so on. An output device or component of the input/output device 164 allows the user to receive information from the user device 112, and may include, for example, a digital display, a speaker, illuminating icons, LEDs, and so on.

The client application 168 is structured to provide displays to the user device 112 that enable the user to manage interactions with the ATM 104 and may be used to manage accounts held with the provider. Accordingly, the client application 168 is communicably coupled to the provider computing system 108 (e.g., the transaction circuit 174, etc.). In some embodiments, the client application 168 may be incorporated with an existing application in use by the provider (e.g., a mobile banking application or a mobile wallet application). In other embodiments, the client application 168 is a separate software application implemented on the user device 112. The client application 168 may be downloaded by the user device 112 prior to its usage, hard coded into the memory of the user device 112, or be a web-based interface application such that the user device 112 may provide a web browser to the application, which may be executed remotely from the user device 112. In the latter instance, the user may have to log onto or access the web-based interface before usage of the applications. Further, and in this regard, the client application 168 may be supported by a separate computing system including one or more servers, processors, network interface circuits, etc. that transmit applications for use to the user device 112. In certain embodiments, the client application 168 includes an API and/or a software development kit (SDK) that facilitate the integration of other applications with the client application 168. For example, the client application 168 may include an API that allows the user to enter one or more sets of transaction instructions for completion by the ATM 104 of the drive-up banking system 100.

The provider computing system 108 is operated by a provider, which is an entity that facilitates the transactions occurring at the ATM 104, as well as the maintenance, repairs, and overall operation of the ATM 104. In some embodiments, the provider computing system 108 also facilitates various types of transactions between the user device 112 and the ATM 104, and between the user device 112 and various other entities. In some embodiments, the provider computing system 108 manages the debit and/or credit card held by a user requesting funds from the ATM 104. For example, the provider may be a bank, credit union, a payment services company, or other similar entities. The provider computing system 108 includes, among other systems, a network interface 170 enabling the provider computing system 108 to exchange data over network 116, a processing circuit 172, and a transaction circuit 174.

The processing circuit 172 includes a processor 176 and memory 180. The processor 176 may be implemented as one or more application specific integrated circuits (ASICs), field programmable gate arrays (FPGAs), a group of processing components, or other suitable electronic processing components. Memory 180 may be one or more devices (e.g., RAM, ROM, Flash memory, hard disk storage) for storing data and/or computer code for completing and/or facilitating the various processes described herein. Memory 180 may be or include non-transient volatile memory, non-volatile memory, and non-transitory computer storage media. Memory 180 may include database components, object code components, script components, or any other type of information structure for supporting the various activities and information structures described herein. Memory 180 may be communicably coupled to the processor 176 and include computer code or instructions for executing one or more processes described herein.

Still referring to FIG. 1, the provider computing system 108 is further shown to include the transaction circuit 174. The transaction circuit 174 is configured to sense proximity of a vehicle, project a user interface onto a vehicle window, determine transaction information based on user interaction with the user interface, and conduct transactions based on the transaction information. Transaction information can include user authentication information, scans of physical media (e.g., physical currency, checks, ATM cards, drivers' licenses, passports, account passbooks, etc.), and transaction instructions. As illustrated in FIG. 1, the provider computing system 108 includes the transaction circuit 174 that is integrated within or otherwise communicable with, the provider computing system 108. In another embodiment, the transaction circuit 174 may be included with the ATM 104 instead. In still another embodiment, the transaction circuit 174 may be included partially with the ATM 104 and partially with the provider computing system 108, with some circuits or components provided with the ATM 104 and some circuits or components provided with the provider computing system 108.

The transaction circuit 174 is shown, according to an example embodiment. The transaction circuit 174 includes a vehicle detection circuit 184, a projection circuit 188, an account determination circuit 192, and a transaction completion circuit 196. While various circuits, interfaces, and logic with particular functionality are shown, it should be understood that the transaction circuit 174 includes any number of circuits, interfaces, and logic for facilitating the functions described herein. For example, the activities of multiple circuits are combined as a single circuit and implemented on the same processing circuit.

The vehicle detection circuit 184 is operably coupled to the vehicle detection device 120 and is configured to receive information indicative of a presence of the vehicle. In some embodiments, the information indicative of the presence of the vehicle can include proximity of the vehicle, weight of the vehicle, an image of the vehicle, heat generated by the vehicle, a wireless signal from the vehicle, a wireless signal from the user device 112. The vehicle detection circuit 184 is configured to determine, based on the information indicative of the presence of the vehicle, whether a vehicle window is positioned proximate the projection device 124 such that the projection device 124 can project the user interface onto the vehicle window or a screen positioned proximate the vehicle window. In some embodiments, the vehicle detection circuit 184 is configured to display a position notification to the user. The position notification can be a light or a sound. In some embodiments, the position notification can indicate that the vehicle is correctly positioned relative to the projection device 124 (e.g., a light can turn on or blink or an acoustic notification can be emitted). In some embodiments, the position notification can indicate that the vehicle needs to be repositioned relative to the projection device 124 (e.g., a light can turn on or blink or an acoustic notification can be emitted).

The projection circuit 188 is configured to activate in response to determining a presence of the vehicle proximate the projection device 124. The projection circuit 188 is operably coupled to the vehicle detection device 120 and is configured to receive information indicative of a position of the vehicle from the vehicle detection device. The projection circuit 188 is configured to determine a position of the vehicle window based on the information indicative of the position of the vehicle. In some embodiments, the projection circuit 188 is configured to project a user interface onto a vehicle window such that a user seated within the vehicle can interact with the user interface at or proximate an interior surface of the vehicle window without opening the vehicle window. In embodiments in which the projection circuit 188 includes the projection screen 152, the projection circuit 188 is configured to command the projection screen drive system 156 to position the projection screen 152 such that the projection screen 152 is proximate the vehicle window. The projection circuit 188 is configured to project a user interface onto a surface of the projection screen 152 closest to the vehicle such that a user seated within the vehicle can interact with the user interface at or proximate the interior surface of the window. The user does not need to open the widow to interact with the user interface projected onto the projection screen 152. The projection circuit 188 is configured to receive display instructions from the account determination circuit 192 and the transaction completion circuit 196 and change the user interface that is displayed to the user in response to the display instructions. In embodiments that include the projection screen 152, the projection circuit 188 is configured to command the projection screen drive system 156 to retract the projection screen 152 in response to determining that the user interaction with the ATM 104 and/or drive-up banking system 100 has been completed. In some embodiments, the projection circuit 188 can display video material onto the projection screen 152. The video material can include animated display instructions or a video-call display of an agent (e.g., banker, drive-up teller, etc.). In embodiments in which the video material is a video call, the agent can ask the user to display physical media proximate the window. The agent can receive an image of the physical media from the camera or the scanning device and manually approve and/or obtain transaction data from the physical media.

The account determination circuit 192 is operably coupled to the sensing device 128 and to the scanning device 132 and is configured to receive transaction information sensed by the sensing device 128 and transaction information scanned by the scanning device 132. The account determination circuit 192 is configured to receive transaction information from a user. The transaction information can include identity information from a user. The identity information can include an identity of the vehicle, an identity of the user device 112, biometric data of the user, or physical identification media such as an ATM card, debit card, account passbook, drivers' license, passport, etc. The identity of the vehicle can include a license plate number, a vehicle identification number, an internet mobile equipment identity (IMEI) of one or more onboard vehicle systems, etc. The identity of the user device 112 can include an IMEI number of the user device 112, an identification number of the specific instance of the client application 168 on the user device 112, etc. In embodiments in which the identity information is the identity of the vehicle or the identity of the user device 112, the account determination circuit 192 can establish a secure connection with the vehicle or the user device 112 over the network 116. The account determination circuit 192 is configured to receive the identity of the vehicle or the identity of the user device 112 over the secure connection. In embodiments in which the identity information is biometric or physical identification media, the account determination circuit 192 is configured to send display instructions to the projection circuit 188 that command the projection circuit 188 to display a request to the user to approach the window for scanning by the scanning device 132 (e.g., for biometric identity information) or to display a request to the user to display the physical identification media at or proximate the vehicle window for scanning by the scanning device 132.

The account determination circuit 192 is configured to determine an account managed by the provider (associated with the provider computing system 108) corresponding to the user based on the identity information. In some embodiments, the account determination circuit 192 can also be configured to determine an account corresponding to the user that is managed by a different provider. The account determination circuit 192 is configured to request user authentication information from the user of vehicle to confirm that the user is authorized to access the account. For example, the account determination circuit 192 is configured to retrieve user authentication data associated with the account from the memory 180 of the provider computing system 108. In some embodiments, the account determination circuit 192 is configured to send display instructions to the projection circuit 188 to display a keypad to the user and request the user to enter a PIN corresponding to the account. The account determination circuit 192 is configured to receive sensed gestures of the user from the sensing device 128 as the user interacts with the user interface. The account determination circuit 192 is configured to determine the PIN entered by the user based on the sensed gestures. In response to determining that the PIN entered by the user matches the PIN of the account, the account determination circuit 192 can begin a transaction. In response to determining that the PIN entered by the user does not match the PIN of the account, the account determination circuit 192 is configured to send display instructions to the projection circuit 188 to display an incorrect PIN indication to the user. In some embodiments, the account determination circuit 192 can lock the account in response to a number of incorrect PINs exceeding a predetermined threshold. In some embodiments, the account determination circuit 192 is configured to send display instructions to the projection circuit 188 to request that the user present a portion of the body (e.g., a face, an eye, a fingerprint) at or proximate the window. The account determination circuit 192 is configured to receive scanned data (e.g., biometric data) from the scanning device 132. In response to determining that the biometric data matches the account, the account determination circuit 192 can activate the transaction completion circuit 196. In response to determining that the biometric data does not match the account, the account determination circuit 192 can send display instructions to the projection circuit to display an error message. In some embodiments, the account determination circuit 192 can lock the account in response to a number of biometric data mismatches between the scanned data and the authentication data associated with the account exceeding a predetermined threshold.

The transaction completion circuit 196 can communicate with the user to determine transaction information based on user interactions with the user interface and complete a transaction using the ATM 104. The transaction completion circuit 196 is operably coupled to the sensing device 128 and to the scanning device 132 and is configured to receive transaction information sensed by the sensing device 128 and transaction information scanned by the scanning device 132. The transaction completion circuit 196 is configured to send display instructions to the projection circuit 188 to request that the user select a type of transaction to be completed. For example, the display instructions can command the projection circuit 188 to display a plurality of buttons corresponding to types of transactions that can be completed by the ATM 104. As another example, the display instructions can command the projection circuit 188 to display a keypad and a typing window to the user of the vehicle. The transaction completion circuit 196 is configured to receive, from the sensing device 128, the sensed gestures made by the user at or proximate the window as the user manipulates the user interface. The transaction completion circuit 196 is configured to determine the type of transaction selected by the user based on the sensed gestures. Types of transactions can include withdrawing physical currency from the account, depositing checks into the account, depositing physical currency into the account, checking a balance of the account, purchasing stamps, etc.

After determining the type of transaction selected by the user, the transaction completion circuit 196 is configured to send display instructions to display one or more transaction completion screens to the user. The transaction screens are configured to obtain transaction information input by the user. In some embodiments, the transaction completion screens can be a predetermined transaction screen or series of predetermined transaction completion screens. In some embodiments, one or more of the transaction completion screens can change based on information entered by the user in via a previously-displayed transaction completion screen. The transaction completion circuit 196 is configured to receive, from the sensing device 128, sensed gestures of the user at or proximate the vehicle window as the user interacts with the transaction completion screens displayed by the user interface. The transaction completion circuit 196 is configured to determine transaction information input by the user via the transaction completion screens based on the sensed gestures. The transaction completion circuit 196 is configured to issue transaction instructions based on the transaction information. The transaction instructions can include presenting a next transaction completion screen. The transaction instructions can command a currency dispenser to dispense physical currency based on the transaction information input by the user. The transaction instructions can command a receiving device to retrieve checks and/or physical currency deposited into the deposit slot based on the transaction information input by the user via the transaction completion screens. The transaction completion circuit 196 is configured to end the transaction in response to receiving an end indicator. In some embodiments, an end indicator can include user selection of a button ending the transaction (e.g., a transaction complete button), a determination that the vehicle is no longer proximate the ATM 104, and/or a period of time with no user activity sensed by the sensing device 128 and/or the scanning device 132 that exceeds a user inactivity threshold.

In some embodiments, the user can select an account balance transaction type. The transaction completion circuit 196 can access the provider computing system 108 to determine the balance of the account. The transaction completion circuit 196 can then send display instructions to command the projection circuit 188 to display the account balance to the user. The display instructions can also command the projection circuit to display buttons to the user to solicit further instructions from the user (e.g., a transaction complete button, a new transaction button, etc.). Accordingly, the user can access the account and input all of the transaction information (e.g., instructions and/or physical media to be deposited) used to check the account balance without opening the vehicle window. In contrast, the window would be open for the entire transaction if the transaction were completed using a conventional ATM in a conventional drive-up banking system.

In some embodiments, the user can select a withdraw physical currency transaction type. The transaction completion circuit 196 can send display instructions to the projection circuit 188 to display a user interface that requests the user to enter an amount of physical currency to withdraw. For example, the user interface can include a keypad for the user to enter an amount of physical currency to withdraw and/or buttons that specify predetermined physical currency amounts for withdrawal ($20, $50, $100), etc. The transaction completion circuit 196 can receive, from the sensing device 128, sensed gestures of the user at or proximate the window as the user interacts with the user interface. The transaction completion circuit 196 determines user instructions based on the sensed gestures. The transaction completion circuit 196 can access the memory 180 provider computing system 108 to determine a balance of the account. In response to determining that the balance of the account is less than an amount of the withdrawal, the transaction completion circuit 196 can send display instructions to the projection circuit 188 to display an insufficient funds notification. In response to determining that the balance of the account is greater than the amount of the withdrawal, the transaction completion circuit 196 can proceed with the withdrawal. In some embodiments, the transaction completion circuit 196 send display instructions to the projection circuit 188 to display a confirmation screen to the user. The confirmation screen may illustrate an amount of the withdrawal and provide buttons that allow the user to confirm or deny the withdrawal. The transaction completion circuit 196 can receive can receive, from the sensing device 128, sensed gestures of the user at or proximate the window as the user interacts with the user interface. The transaction completion circuit 196 determines transaction information indicative of user instructions based on the sensed gestures. The transaction completion circuit 196 then commands the currency dispensing device to dispense the amount of currency requested by the user. At this point, the user for the first time in the transaction opens the vehicle window to retrieve the physical currency. The display instructions can also command the projection circuit to display buttons to the user to solicit further instructions from the user (e.g., a transaction complete button, a new transaction button, etc.). Accordingly, the user can access the account and input all of the transaction information (e.g., instructions and/or physical media to be deposited) used to complete the transaction without opening the vehicle window. The window over the vehicle only needs to be opened to retrieve the physical currency. Therefore, the vehicle window is open for a much shorter time than the window is open when conducting transactions using a conventional ATM in a conventional drive-up banking system.

In some embodiments, the user can select a deposit physical currency or deposit check transaction type. The transaction completion circuit 196 sends display instructions to the projection circuit 188 to display a user interface that requests the user to display check(s) or physical currency to be deposited at or proximate the window. The transaction completion circuit 196 can receive transaction information including the scan(s) of the check(s) or physical currency scanned by the scanning device 132. In some embodiments, the transaction completion circuit 196 may request that each check or currency bill is presented individually to be scanned. The transaction completion circuit 196 determines a total amount of money to be deposited based on the scanned check(s) or physical currency. In some embodiments, the transaction completion circuit 196 sends display instructions to the projection circuit 188 to display a confirmation screen to the user. The confirmation screen may illustrate an amount of money to be deposited and provide buttons that allow the user to confirm or deny the deposit. The transaction completion circuit 196 can receive, from the sensing device 128, sensed gestures of the user at or proximate the window as the user interacts with the user interface. The transaction completion circuit 196 determines the user instructions (e.g., the transaction information) based on the sensed gestures. The transaction completion circuit 196 then sends display instructions to the projection circuit 188 to prompt the user to deposit the check(s) or physical currency into the deposit slot of the ATM 104. At this point, the user, for the first time in the transaction, opens the vehicle window to deposit the checks or the physical currency into the ATM 104. The transaction completion circuit 196 then commands the currency receiving device to retrieve the check(s) or physical currency deposited by the user. The display instructions can also command the projection circuit to display selections or buttons to the user to solicit further instructions from the user (e.g., a transaction complete button, a new transaction button, etc.). Accordingly, the user can access the account and input all of the transaction information (e.g., instructions and/or physical media to be deposited) used to complete the transaction without opening the vehicle window. The window of the vehicle only needs to be opened to deposit the checks and/or the physical currency. Therefore, the vehicle window is open for a much shorter time than the window is open when conducting transactions using a conventional ATM in a conventional drive-up banking system.

In some embodiments, the account determination circuit 192 calls the user device 112 after determining the account corresponding to the user based on the identity information. After the user answers the call, the account determination circuit 192 and the transaction completion circuit 196 can provide voice instructions to the user either instead of or in addition to the user interface that is projected onto the vehicle window. The account determination circuit 192 and the transaction completion circuit 196 can determine account authentication information and transaction instructions, respectively, based on voice commands received from the user by the user device 112.

In some embodiments, the account determination circuit 192 calls the user device 112 after determining the account corresponding to the user based on the identity information. After the user answers the call, the account determination circuit 192 and the transaction completion circuit 196 can provide display instructions to the projection circuit 188 to provide the user interface as described above. Instead of or in addition to making selections using gestures at or proximate the window, the user can make verbal responses based on questions, buttons, instructions, etc. displayed on the user interface. The account determination circuit 192 and the transaction completion circuit 196 can determine account authentication information and transaction instructions, respectively, based on voice commands received from the user by the user device 112.

In some embodiments, the transaction completion circuit 196 is configured to establish a secure connection with the user device 112. The client application 168 can send transaction information including transaction instructions entered via the client application 168 to the transaction completion circuit 196. The transaction completion circuit 196 is configured to receive the transaction instructions from the client application 168. The transaction completion circuit 196 is configured to send display instructions to the projection circuit 188 to display the transaction instructions to the user and provide response selections or buttons to the user. For example, the response buttons can allow the user to confirm, modify, or cancel the displayed transaction. The transaction completion circuit 196 is configured to receive, from the sensing device 128, the sensed gestures made by the user as the user manipulates the user interface displayed on the vehicle window. The transaction completion circuit 196 is configured to determine transaction instructions based on the gestures. For example, in response to receiving transaction instructions including user acceptance of the transaction instructions, the transaction completion circuit 196 carries out the transaction instructions. In another example, in response to receiving transaction instructions to modify the pending transaction or the transaction instructions, the transaction completion circuit 196 is configured to send display instructions to the projection circuit 188 to display one or more transaction completion screens to the user and determine modified transaction instructions in a similar manner to what is as described above. In another example, in response to receiving transaction instructions to cancel the transaction instructions, the transaction completion circuit 196 cancels the transaction instructions. In some embodiments, the user device 112 can include a braille interface. In such an embodiment, a blind or visually impaired person can use the user device 112 to enter the transaction instructions via the client application 168. A sighted assistant can then follow the display instructions described above.

Figure 2A:
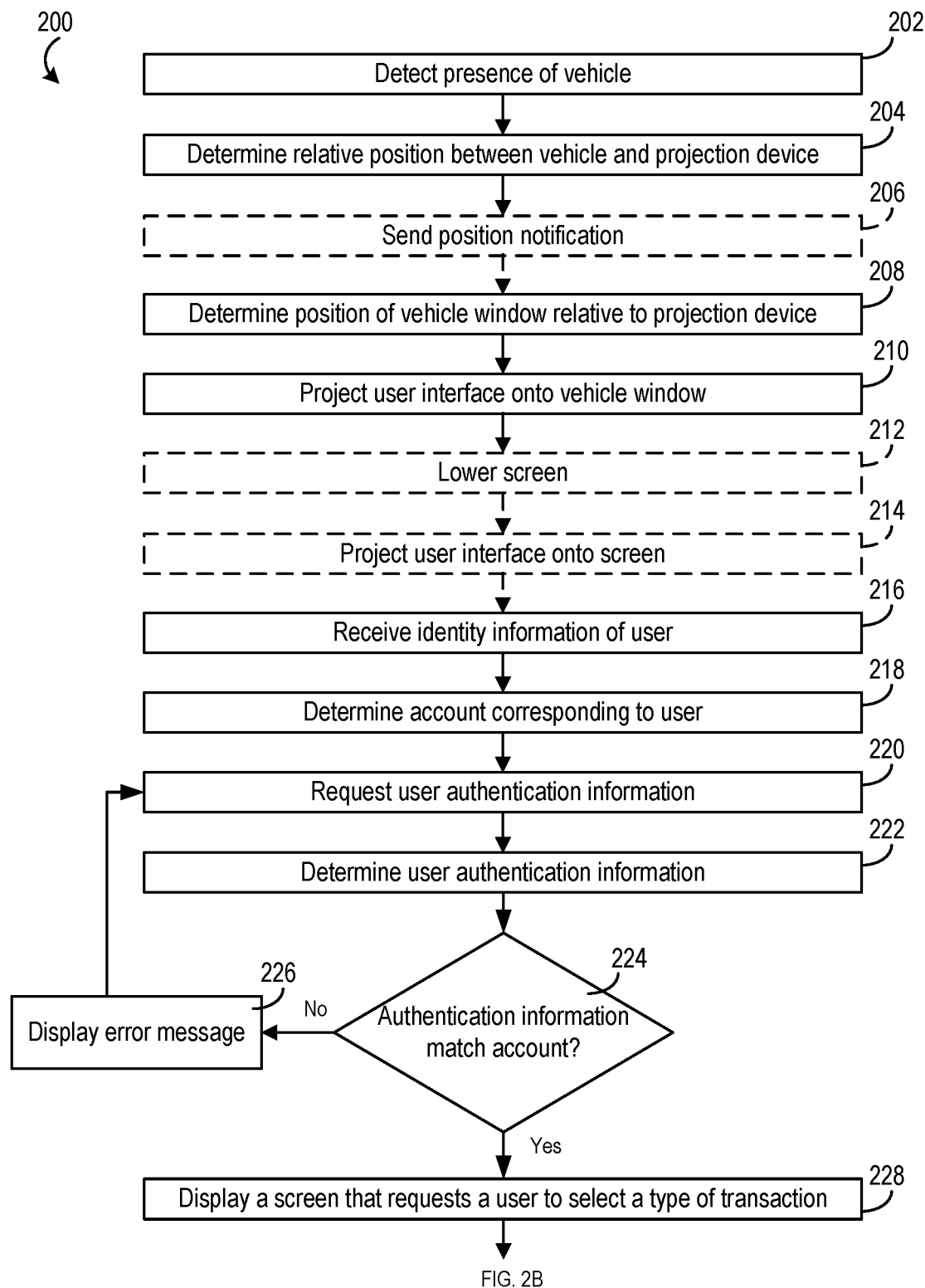
FIGS. 2A-2B are process diagrams depicting a method of conducting a transaction with the ATM of FIG. 1, according to an example embodiment.
Figure 2B:
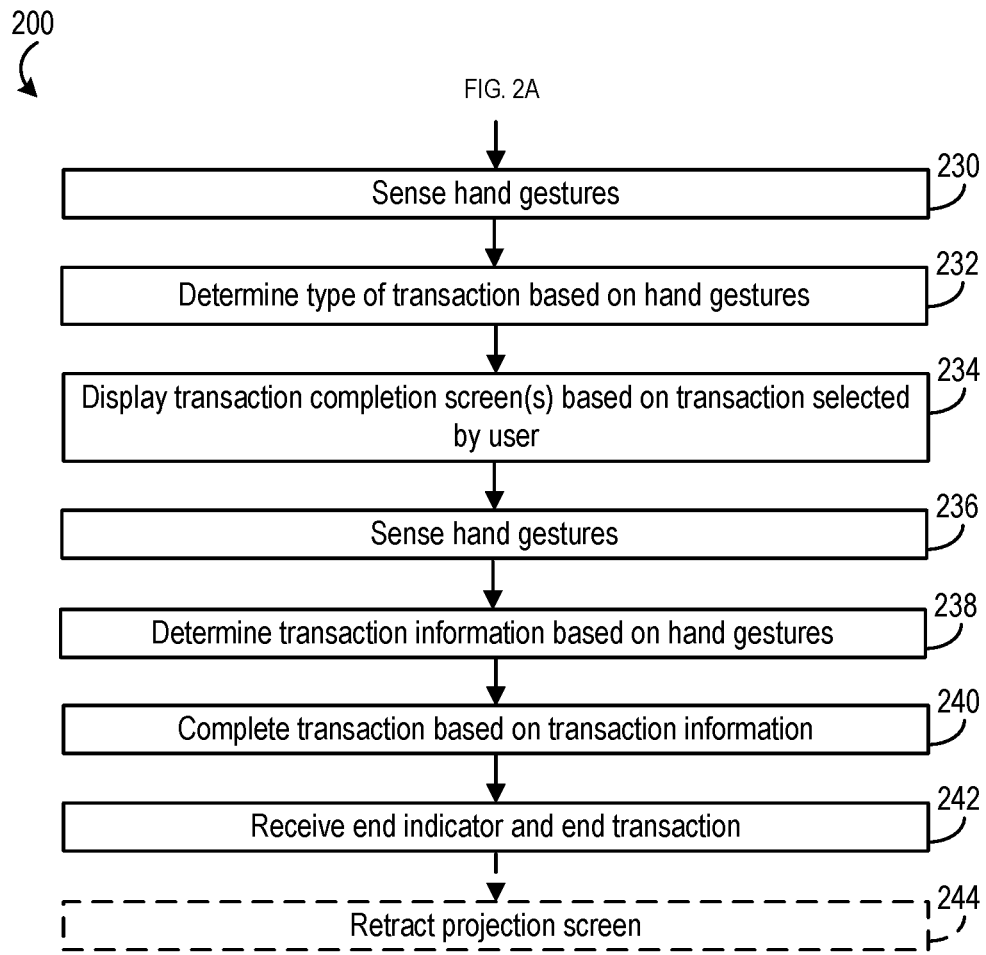

Referring now to FIGS. 2A-2B, a flow diagram of a method 200 of conducting a transaction with the drive-up banking system 100 while minimizing an amount of time that a user of the drive-up banking system 100 is exposed to the outdoor environment is shown. In various embodiments, the method 200 is performed by the components shown in FIG. 1 such that reference may be made to the components of FIG. 1 to aid in the description of the method 200. In some arrangements, the method 200 is performed by the provider computing system 108.

The vehicle detection device detects a presence of a vehicle proximate the drive-up banking system 100 or the ATM 104 at 202. The vehicle detection device 120 sends information indicative of the presence of the vehicle to the vehicle detection circuit 184. The vehicle detection circuit 184 determines, based on information indicative of a position of the vehicle, a relative position between the vehicle and the projection device 124 at 204. The vehicle detection circuit sends a position notification to the user at optional step 206. In some embodiments, the position notification is a light or a sound. In some embodiments, the position notification indicates that the vehicle is correctly positioned relative to the projection device 124. In some embodiments, the position notification indicates that the vehicle needs to be repositioned relative to the projection device 124.

The projection circuit 188 activates in response to determining the presence of the vehicle proximate the ATM 104. The projection circuit 188 determines the position of the vehicle window relative to the projection device 124 at 208. In some embodiments, the projection circuit 188 commands the projection device 124 to project the user interface onto the vehicle window such that the user interface is visible to the user sitting inside of the vehicle at 210. The user can interact with the user interface without lowering the vehicle window. In other embodiments, the projection circuit 188 commands the projection screen drive system 156 to position the projection screen 152 proximate the vehicle at 212. The projection circuit 188 commands the projection device 124 to project the user interface onto the surface of the projection screen 152 proximate the window such that the user interface is visible to the user sitting inside of the vehicle at 214. The user can interact with the user interface without lowering the vehicle window or opening the vehicle door.

The account determination circuit 192 receives identity information of a user (e.g., an occupant) of the vehicle at step 216. In some embodiments, the account determination circuit 192 may establish a secure connection between the operating system of the vehicle and/or the user device 112 and receive identity information from the vehicle or the user device 112. In some embodiments, the account determination circuit may send display instructions to the projection circuit to display a request to the user to position a portion of the body (e.g., face, fingerprint, or eye) or physical identification media (e.g., an ATM card, a debit card, an account passbook, a drivers' license, a passport, etc.) at or proximate the window. The scanning device 132 then scans the portion of the body or the physical identification media to generate transaction information indicative of the biometric identity information or the physical identification media, respectively.

The account determination circuit 192 determines an account managed by the provider that corresponds to the user based on the identity information at 218. In some embodiments, the account determination circuit 192 can also determine an account managed by a different provider that corresponds to the identity of the user. The account determination circuit 192 requests user authentication information from the user at 220. For example, the account determination circuit 192 sends display instructions to the projection circuit to prompt the user to enter user authentication information. For example, the projection circuit can display a keypad to the user and request the user to enter a PIN corresponding to the account. In another example, the projection circuit can display a request that the user present a portion of the body (e.g., a face, an eye, a fingerprint) at or proximate the window and the scanning device scans portion of the body proximate the window. The account determination circuit 192 determines the user authentication information (e.g., the transaction information) at 222. For example, the account determination circuit 192 can determine the PIN entered by the user based on gestures sensed by the sensing device 128 at or proximate the user interface while interacting with the user interface to provide the user authentication information. The user can tap the keys of the keypad to enter the PIN. The sensing device 128 can detect the taps and send the taps to the account determination circuit 192. The account determination circuit 192 can determine the keys of the keypad that the user touched and the order in which the keys were touched to determine the pin entered by the user. In another example, the account determination circuit can determine biometric user authentication information based images scanned by the scanning device 132. The account determination circuit 192 determines whether the user authentication information matches the account at 224. For example, the account determination circuit 192 can access the provider computing system 108 to determine the user authentication information (e.g., a PIN, biometric data, etc.) corresponding to the account. The account determination circuit 192 can then compare the PIN or the biometric data to a PIN or biometric data corresponding to the account. The account determination circuit 192 displays an error message in response to determining that the user authentication information does not correspond to the account at 226. The account determination circuit 192 may then may return to 320. In some embodiments, in response to a number of incorrect attempts to enter user authentication data exceeding a predetermined threshold, the account determination circuit 192 can lock the account.

At 228, the transaction completion circuit 196 sends display instructions to the projection circuit 188 to display a screen that requests the user to select a type of transaction in response to the account determination circuit 192 determining that the user authentication information corresponds to the account. For example, the projection circuit 188 may display a screen that includes a plurality of buttons indicating transaction types that can be completed by the ATM 104. In another example, the projection circuit 188 may display a screen that includes a text entry window and a keypad. Types of transactions can include withdrawing physical currency from the account, depositing checks into the account, depositing physical currency into the account, checking a balance of the account, and purchasing stamps. The sensing device 128 senses the gestures that the user makes as the user interacts with user interface to select a transaction and sends the sensed gestures to the transaction completion circuit 196 at 230. At 232, the transaction completion circuit 196 determines the type of transaction (e.g., the transaction information) selected by the user based on the gestures sensed by the sensing device 128.

For example, in embodiments in which the user interface includes the plurality of buttons that indicate transaction types, the user can tap any of the buttons to select a transaction. The sensing device 128 can detect the tap and send the tap to the transaction completion circuit 196. The transaction completion circuit 196 can determine the button that the user selects to determine the transaction selected by the user. In other embodiments, in embodiments in which the user interface includes the plurality of buttons that indicate transaction types, the user can hold up a number of fingers that correspond to a selection (e.g., the user holds up one finger to choose a first transaction option, two fingers to choose a second transaction option, etc.), finger spell a selection, or sign a selection. The sensing device 128 can sense the number of fingers the user is holding up and send the number of fingers, the finger-spelled gesture sequence, or the sign to the transaction completion circuit 196. The account determination circuit 192 can determine the transaction selected by the user based on the number of fingers the user was holding up, the finger-spelled sequence, or the sign. In embodiments in which the displayed screen includes the keypad and the text entry window, the user can tap the keys of the keypad to enter a word. The sensing device 128 can sense the taps and send the taps to the transaction completion circuit 196. The transaction completion circuit 196 can determine the keys of the keypad that that the user touched and the order in which the keys were touched to determine the word entered by the user. In some embodiments, the transaction completion circuit 196 can determine the transaction selected by the user based on the word. In some embodiments, the transaction completion circuit 196 can use the word entered by the user as an input to a search function. The transaction completion circuit 196 can then display transaction type determined by the search function to the user. For example, the user may enter the word "cash". The sensing device 128 senses the user's gestures as the user enters the word "cash" using the keypad. The transaction completion circuit 196 determines that the user entered the word "cash" based on the user's gestures as the user interacted with the keypad. The transaction completion circuit 196 then enters the word "cash" into the search function. The transaction completion circuit 196 then sends display instructions that command the projection circuit 118 to present the user with the options to "deposit cash" and "withdraw cash" such that the user can select a transaction.

At 234, the transaction completion circuit 196 sends display instructions to the projection circuit 188 based on the type of transaction such that the transaction completion circuit 196 displays one or more transaction completion screens corresponding to the type of transaction selected by the user. In some embodiments, a predetermined transaction completion screen or series of predetermined transaction completion screens can be displayed to the user. In some embodiments, one or more of the transaction completion screens can change based on information entered by the user in via a previously-displayed transaction completion screen. For each of the transaction completion screens displayed to the user, the sensing device 128 senses the gestures the user makes as the user interacts with user interface to input transaction instructions (e.g., transaction information) and sends the sensed gestures to the transaction completion circuit 196 at 236. The gestures can include hand gestures such as tapping, tapping and holding, pinching the screen (e.g., to shrink at least a portion the user interface), spreading apart pinched fingers (e.g., to expand at least a portion of the user interface), scrolling, sliding, holding up fingers to indicate a selection, making the "o.k. sign", holding a thumb up, holding a thumb down, finger-spelling, sign language, etc. The gestures can include facial gestures such as facial expressions (e.g., frown into indicate "no" or "help", smile to indicate "yes", etc.), nodding, shaking the head, etc. At 238, the transaction completion circuit 196 determines transaction instructions collected from each of the screens based on the gestures sensed by the sensing device 128. At 240, the transaction completion circuit 196 completes the transaction in accordance with the transaction instructions provided by the user. The transaction completion circuit 196 ends the user interaction in response to receiving an end indicator at 242. In some embodiments, an end indicator can include user selection of button (e.g., a transaction complete button), a determination that the vehicle is no longer proximate the ATM, and/or a period of time with no user activity sensed by the sensing device 128 and/or the scanning device 132 that exceeds a user inactivity threshold. In some embodiments, the projection circuit 188 commands the projection screen drive system 156 to retract the projection screen 152 at 244.

Figure 3A:
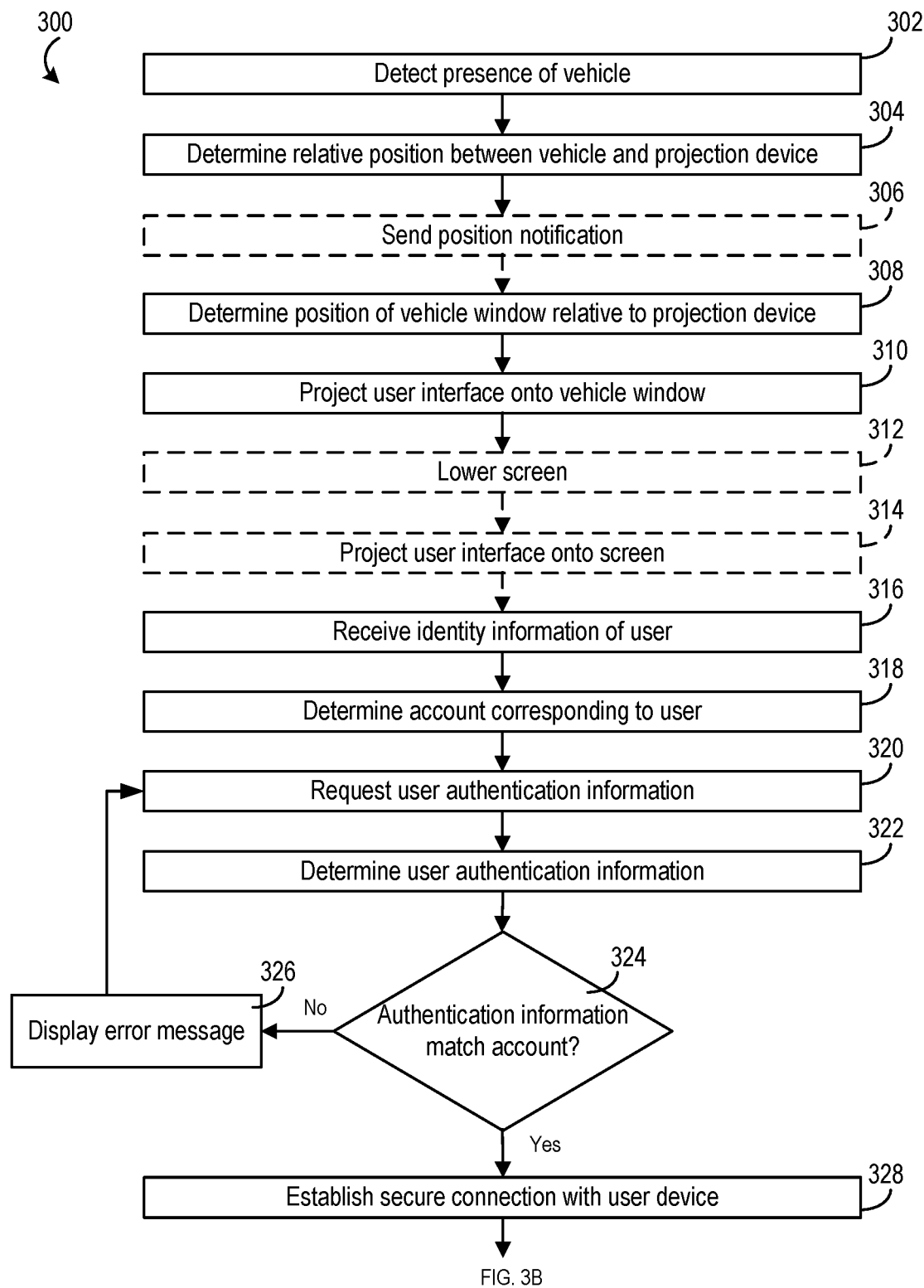
FIGS. 3A-3B are process diagrams depicting a method of conducting a transaction with the ATM of FIG. 1, according to another example embodiment.
Figure 3B:
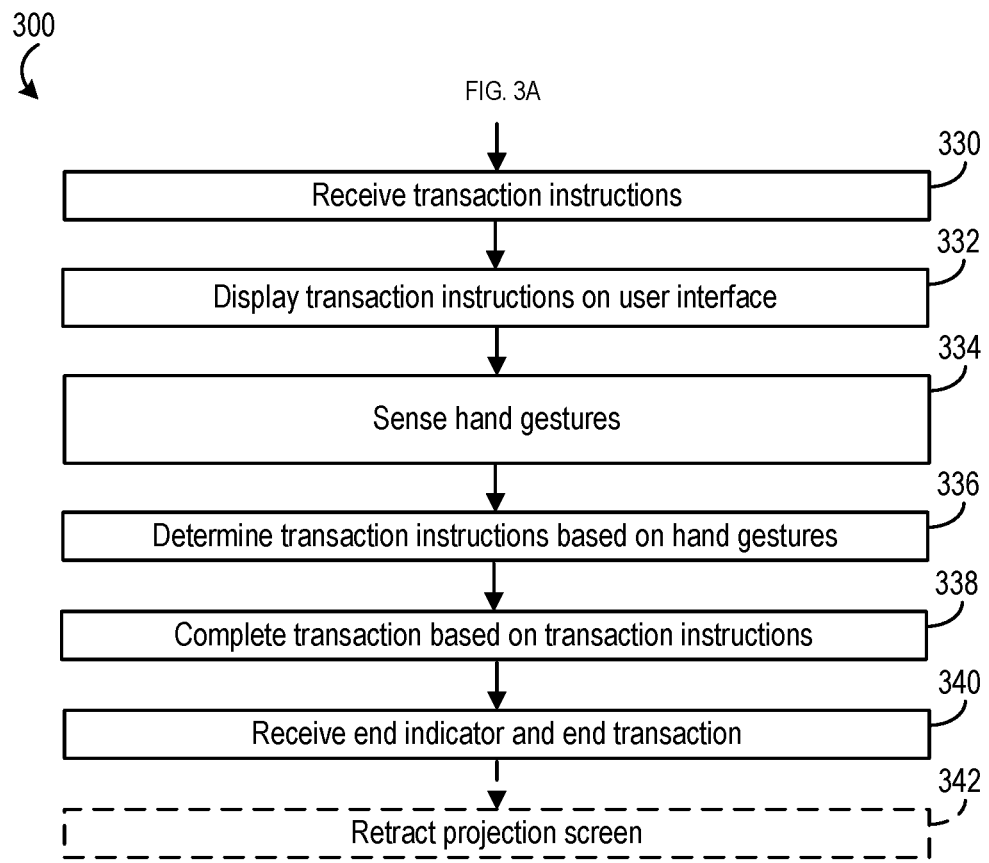

Referring now to FIGS. 3A-3B, a flow diagram of a method 300 of conducting a transaction with the drive-up banking system 100 while minimizing an amount of time that a user of the drive-up banking system 100 is exposed to the outdoor environment is shown. In various embodiments, the method 300 is performed by the components shown in FIG. 1 such that reference may be made to the components of FIG. 1 to aid the description of the method 300. In some arrangements, the method 300 is performed by the provider computing system 108. Steps 302-326 of the method 300 are substantially the same as the steps 202-226 of the method 200. Although steps 302-326 are shown in FIGS. 3A-3B, they are not described in detail herein for the sake of brevity.

The transaction completion circuit 196 establishes a secure connection with the user device 112 at 328. The transaction completion circuit 196 receives transaction instructions from the user device 112 over the secure connection at 330. The transaction completion circuit 196 sends display instructions to the projection circuit 188 to display the transaction instructions to the user at 332. The display includes user inputs regarding the transaction instructions. For example, the user interface can display buttons selectable by the user to confirm, modify, or cancel the transaction instructions. The sensing device 128 senses the gestures of the user at or proximate the window as the user interacts with the user interface at 334. In some embodiments, the user can tap a button to confirm, modify, or cancel the transaction instructions. In some embodiments, the user can hold up a number of fingers indicating whether the user wants to confirm, modify, or cancel the transaction instructions (e.g., the user can hold up one finger to confirm, two fingers to modify, or three fingers to cancel the transaction instructions, etc.). In some embodiments, the user can display the "ok-sign" or a thumb up to accept the transaction instructions. In some embodiments, the user can display a thumb down to cancel or modify the transaction instructions. In some embodiments, the user can use finger-spelling or sign language to select whether to confirm, modify, or cancel the transaction instructions. At 336, the transaction completion circuit 196 determines transaction instructions based on the gestures sensed by the user. For example, in response to receiving transaction instructions including user acceptance of the transaction instructions, the transaction completion circuit 196 carries out the transaction instructions. In another example, in response to receiving transaction instructions to modify the transaction instructions, transaction completion circuit 196 is configured to send display instructions to display one or more transaction completion screens to the user and determine transaction instructions as described above. In another example, in response to receiving transaction instructions to cancel the transaction instructions, the transaction completion circuit 196 cancels the transaction instructions. The transaction completion circuit 196 carries out the determined user instructions at 338. The transaction completion circuit 196 ends the user interaction in response to receiving an end indicator at 340. In some embodiments, an end indicator can include user selection of button ending the transaction (e.g., a transaction complete button), a determination that the vehicle is no longer proximate the ATM, and/or a period of time with no user activity sensed by the sensing device 128 and/or the scanning device 132 that exceeds a user inactivity threshold. In some embodiments, the projection circuit 188 commands the projection screen drive system 156 to retract the projection screen 152 at 342.

Figure 4:
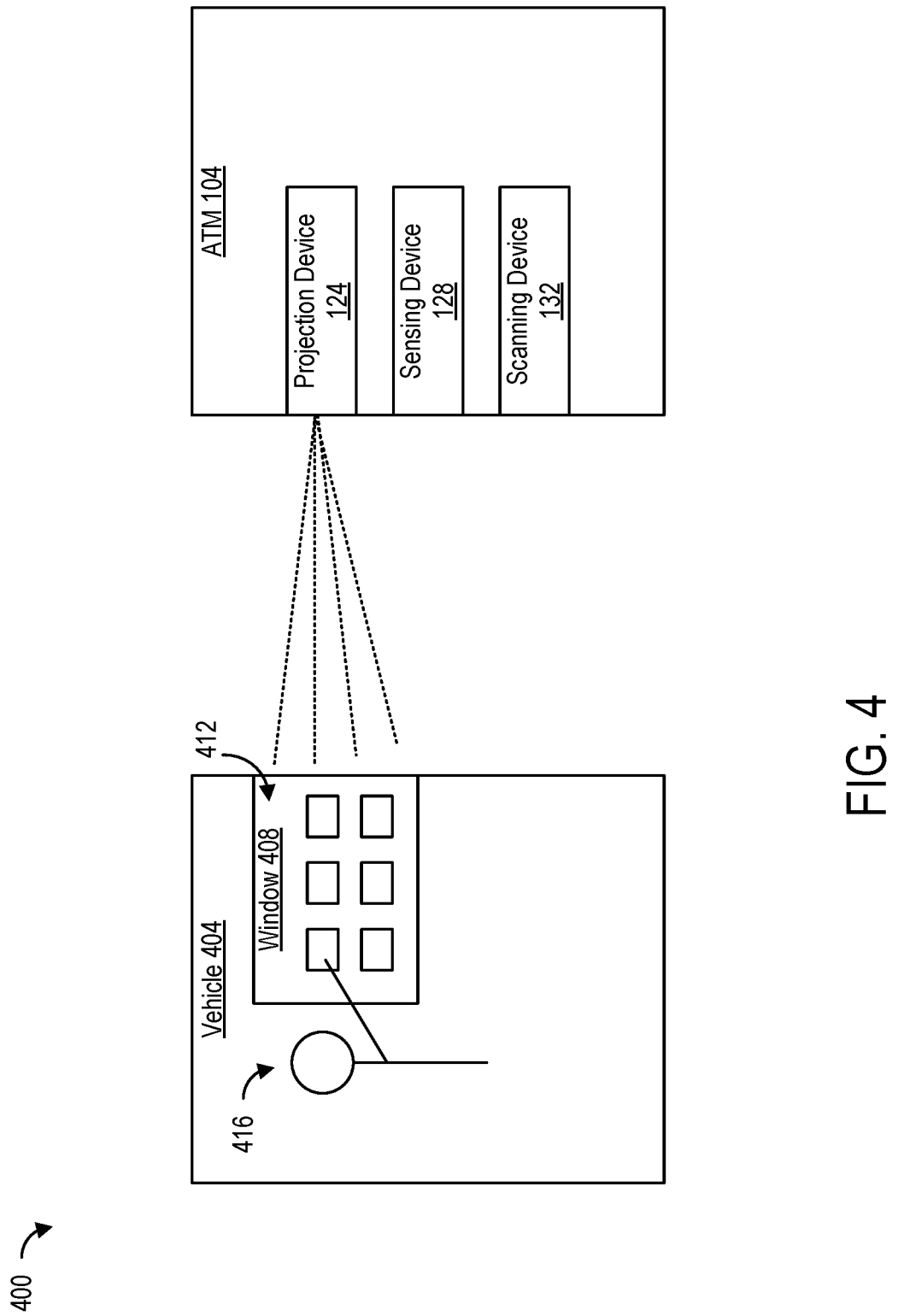
FIG. 4 is a schematic diagram depicting an environment in which the drive-up banking system of FIG. 1 is used, according to an example embodiment.

Referring to FIG. 4, an environment 400 in which an occupant of a vehicle is conducting a transaction using the ATM 104 is shown, according to an example embodiment. FIG. 4 illustrates a vehicle 404 including a vehicle window 408 is positioned relative to the ATM 104 such that the projection device 124 can project a user interface 412 onto the vehicle window 408. An occupant 416 of the vehicle 404 can interact with the user interface 412 that is projected onto the vehicle window 408 by the projection device 124. The sensing device 128 can sense gestures made by the occupant 416 at or proximate the vehicle window 408 as the occupant 416 interacts with the user interface 412. The scanning device 132 can scan physical media presented at or proximate the vehicle window 408 by the occupant 416.

Figure 5:
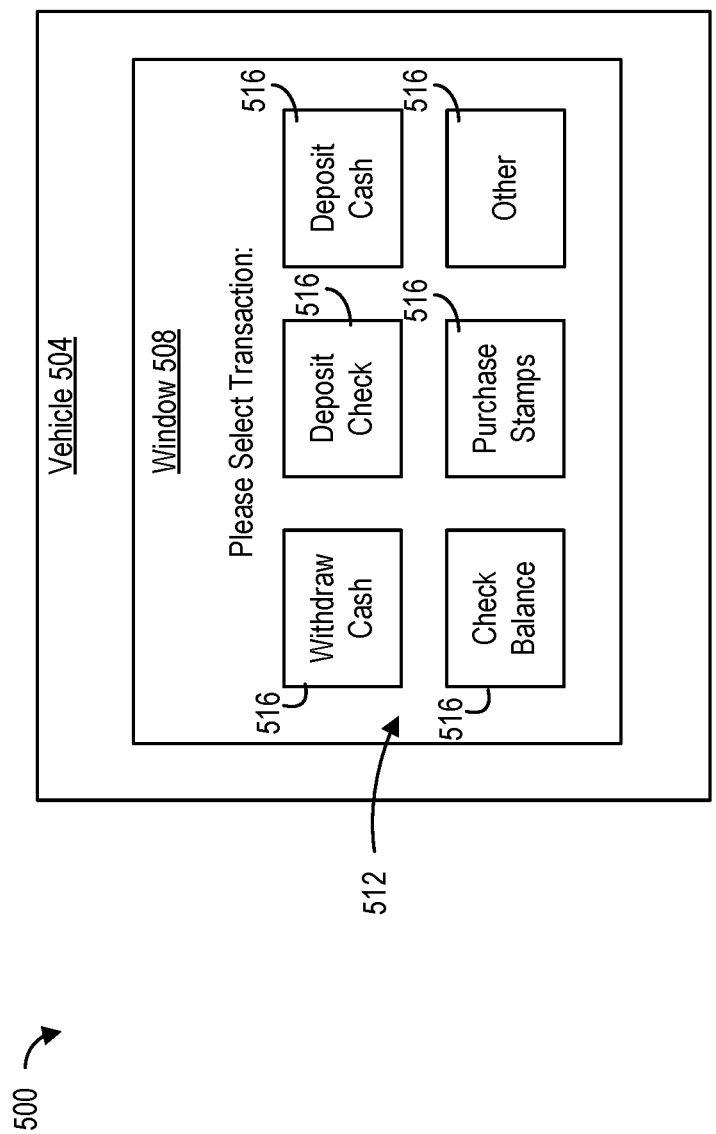
FIG. 5 is a schematic diagram depicting a user interface that is projected onto a vehicle window by the drive-up banking system of FIG. 1.

Referring to FIG. 5, an environment 500 illustrating a user interface that is projected onto a vehicle window by the ATM 104 (FIG. 4) is shown, according to an example embodiment. FIG. 5 illustrates a vehicle 504 that includes a vehicle window 508 onto which the projection device 124 (FIG. 4) projects a user interface 512. The user interface 512 prompts an occupant of the vehicle 504 to select a transaction to complete using the ATM 104. In the example illustrated in FIG. 5, the user interface 512 includes a plurality of buttons 516 that can be interacted with by the occupant to select a type of transaction. The occupant of the vehicle can interact with the user interface 512 in the same manner as the occupant would interact with a touch screen. For example, the occupant can touch, tap, touch and hold, etc. one of the buttons 516 to select a transaction type. The sensing device 128 (FIG. 4) can sense the gestures of the occupant's hand as the occupant interacts with the user interface 512 to select one of the buttons 516.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Ripple, Litecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web embodiments of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising: detecting, by a drive-up banking system, a presence of a vehicle proximate the drive-up banking system; projecting, by the drive-up banking system, a user interface onto a vehicle window such that the user interface is visible to the occupant of the vehicle; receiving, by the drive-up banking system, information indicative of an identity of an occupant of the vehicle; determining, by the drive-up banking system, an account corresponding to the occupant of the vehicle; requesting, by the user interface of the drive-up banking system, transaction information; identifying, by the drive-up banking system, physical media positioned at or proximate an interior surface of the vehicle window; scanning the physical media by a scanning device of the drive-up banking system, the scanning device configured to capture an image of the physical media; receiving, by the user interface of the drive-up banking system, information indicative of the transaction information; and conducting, by the drive-up banking system, a transaction based on the transaction information and the image of the physical media;
 wherein receiving, by the drive-up banking system, the transaction information includes: establishing, by the drive-up banking system, a secure connection with a client computing device positioned within the vehicle; receiving, from the client computing device, transaction instructions initiated by the user via the client computing device; requesting, by the drive-up banking system, user authentication information via the user interface: receiving, by the drive-up banking system, the user authentication information, wherein receiving user authentication information includes scanning physical media including user authentication information and/or sensing gestures made at or proximate the vehicle window indicative of the user authentication information.

2. The method of claim 1, wherein the physical media includes a user identification document, a check, or physical currency.

3. The method of claim 1, wherein the step of receiving, by the drive-up banking system, the transaction information includes: receiving, by a sensor of the drive-up banking system, gestures at or proximate an interior surface of the vehicle window.

4. The method of claim 3, wherein the gestures are indicative of at least one of: user authentication information, information indicative of a type of transaction, information indicative of an amount of money, confirmation of a transaction information displayed on the user interface, or cancellation of transaction information displayed on the user interface.

5. The method of claim 3, wherein the sensor is a motion sensor, a heat sensor, or a visual sensor.

6. The method of claim 1, wherein the user interface is projected onto a film secured to the vehicle window.

7. The method of claim 1, wherein the transaction includes at least one of withdrawing physical currency from the account, depositing a check into the account, viewing a balance of the account, and depositing physical currency into the account.

8. A drive-up banking system comprising: a vehicle detection device; a projection device configured to project a user interface onto a vehicle window; a user input device comprising a scanning device configured to capture an image of physical media; and a processing circuit comprising one or more processors coupled to non-transitory memory, the processing circuit configured to: detect a presence of a vehicle including the vehicle window proximate the vehicle detection device; command the projection device to project the user interface onto the vehicle window; receive information indicative of an identity of an occupant of the vehicle; determine an account corresponding to the occupant of the vehicle; display a request for transaction information via the user interface; receive information indicative of the transaction information via the user input device, wherein the transaction information includes the image of the physical media; and conduct a transaction based on the transaction information;
 wherein the processing circuit is further configured to: identify physical media positioned at or proximate an interior surface of the vehicle window; and command the scanning device to scan the physical media to receive the transaction information;
 wherein the processing circuit is further configured to: establish a secure connection with a client computing device positioned within the vehicle: receive transaction instructions initiated by the user via the client computing device; request user authentication information via the user interface; and receive the user authentication information by from the user input device.

9. The drive-up banking system of claim 8, wherein the physical media includes a user identification document, a check, or physical currency.

10. The drive-up banking system of claim 8, wherein the user input device is a sensor configured to sense gestures at or proximate the interior surface of the vehicle window and wherein the processing circuit is further configured to determine the transaction instructions based on the sensed gestures.

11. The drive-up banking system of claim 10, wherein the gestures are indicative of user authentication information, a type of transaction, an amount of money, confirmation of transaction information displayed on the user interface, or cancellation of transaction information displayed on the user interface.

12. The drive-up banking system of claim 10, wherein the sensor is a motion sensor, a heat sensor, or a visual sensor.

13. The drive-up banking system of claim 8, wherein the user interface is projected onto a film secured to the vehicle window.

14. The drive-up banking system of claim 8, wherein the transaction includes at least one of withdrawing physical currency from the account, depositing a check into the account, viewing a balance of the account, and depositing physical currency into the account.

15. A drive-up banking system comprising: a vehicle detection device; a screen configured to be positioned proximate a vehicle window; a projection device configured to project a user interface onto the screen; a scanning device configured to capture an image of physical media at or proximate the vehicle window; a scanning device configured to capture an image of physical media at or proximate the vehicle window; a heat sensor configured to sense gestures at or proximate the vehicle window; and a processing circuit comprising one or more processors coupled to non-transitory memory, the processing circuit configured to; detect a presence of a vehicle including the vehicle window proximate the vehicle detection device; positon the screen proximate the vehicle window; command the projection device to project the user interface onto the screen; obtain the image of physical media using the scanning device; determine an identity of an occupant of the vehicle based on the image of physical media; determine an account corresponding to the identity of the occupant of the vehicle; display a request for transaction information via the user interface; determine transaction information based on the gestures sensed by the heat sensor; and conduct a transaction based on the transaction information, wherein the processing circuit is further configured to: establish a secure connection with a client computing device positioned within the vehicle; receive transaction instructions initiated by the user via the client computing device; request user authentication information via the user interface; and determine the user authentication information based on the gestures sensed by the heat sensor.

16. The drive-up banking system of claim 15, wherein the gestures are indicative of user authentication information, a type of transaction, an amount of money, confirmation of transaction information displayed on the user interface, or cancellation of transaction information displayed on the user interface.

17. The drive-up banking system of claim 15, wherein the processing circuit is further configured to: identify physical media positioned at or proximate an interior surface of the vehicle window; command the scanning device to scan the physical media to receive the transaction information; and determine transaction information based on the scanned physical media.

18. The drive-up banking system of claim 17, wherein the physical media includes an identification document, a check, or physical currency.

19. The drive-up banking system of claim 15, wherein the transaction includes at least one of withdrawing physical currency from the account, depositing a check into the account, viewing a balance of the account, and depositing physical currency into the account.

* * * * *